United States Patent Office 2,710,991
Patented June 21, 1955

2,710,991

MANUFACTURE OF ARTICLES FROM A POLYMER OF TETRAFLUOROETHYLENE

Alan Thomas Barrington Parkhurst Squires, Allenton, Derby, and Clifford George Hannah, Alvaston, Derby, England, assignors to Rolls-Royce Limited, Derby, England, a British company No Drawing. Application January 18, 1951, Serial No. 206,721

Claims priority, application Great Britain January 26, 1950

9 Claims. (Cl. 18—59.2)

This invention relates to articles consisting essentially of a polymer of tetrafluoroethylene and to methods of manufacture of such articles.

By a "polymer of tetrafluoroethylene" as employed in this specification is meant a product obtained by polymerising tetrafluoroethylene either in the absence of other unsaturated compounds which will polymerise with tetrafluoroethylene or interpolymers of tetrafluoroethylene with other polymerisable compounds such as isobutylene or ethylene. Moreover in this specification the term "polytetrafluoroethylene" is used to designate the product obtained by polymerising tetrafluoroethylene in the absence of other unsaturated compounds which will polymerise therewith.

The invention will be described hereinafter as applied to articles produced from polytetrafluoroethylene but it will be understood that the invention is also applicable to other polymers of tetrafluoroethylene.

In producing articles from polytetrafluoroethylene it is usual to apply the methods of powder metallurgy, the article being formed by the steps of introducing very finely divided powder into a mould, compressing the powder to the desired shape in the mould, heating the preform thus produced to a sintering temperature and then cooling the sintered article.

The sintering temperature for polytetrafluoroethylene is a temperature above 327° C. (the transition temperature) but not higher than 500° C.

The moulded sintered article of polytetrafluoroethylene may be cooled either rapidly or slowly and it is found that if the article is cooled rapidly through the transition temperature, the product is substantially amorphous in character, whereas if the article is cooled slowly through the transition temperature it has a substantially crystalline structure. For most purposes it is preferred to manufacture articles from polytetrafluoroethylene by the process in which the article is cooled rapidly through the transition temperature, since the resulting article has a higher tensile strength and a substantially increased ultimate elongation.

This invention is concerned with producing articles from polytetrafluoroethylene by the moulding and sintering methods above described and has for an object to provide improvements in these methods to avoid certain disadvantages that have been experienced in carrying out the methods.

It has been found for instance in producing thin articles from polytetrafluoroethylene, in the form of sheets, discs, diaphragms or the like, that, if the moulding pressure is applied directly to the powder in the mould, areas of the article do not sinter satisfactorily and that these areas form weak friable spots in the finished article. These "low pressure" spots do not normally occur in the production of articles of thickness greater than about 0.15", and in this specification the term "thin article" means an article the thickness of which renders it liable to the formation of low pressure spots in manufacture.

This invention has for an object to provide an improved method of manufacturing thin articles from a polymer of tetrafluoroethylene in which the formation of low pressure spots is avoided.

According to the present invention, there is provided a method of producing thin sheet-like articles from a polymer of tetrafluoroethylene by moulding and sintering, wherein the moulding pressure is applied uniformly over the charge in a mould thereby to avoid low pressure spots.

According to one arrangement according to this invention, a uniform distribution of the moulding pressure for the charge may be ensured by applying the moulding pressure to the charge through a sheet of flexible resilient material such as rubber. For instance, a rubber sheet of 60° Shore hardness and 1/8" thickness may be interposed between the powder charge and the platen of the ram of the moulding apparatus. It has been found that by applying the moulding pressure in this manner "low pressure" spots in the finished articles can be avoided. This method of avoiding low pressure spots may be employed either for producing thin articles one at a time or for producing a plurality of thin articles simultaneously.

This invention includes as another aspect a method of producing simultaneously a plurality of thin, moulded and sintered sheet-like articles from polytetrafluoroethylene, which method comprises introducing into a mould in superposed relationship a plurality of charges of moulding powder, each charge of moulding powder being separated from each adjacent charge by a separator sheet of flexible material, for example linen tracing paper, and applying the moulding pressure uniformly to the charges through a flexible resilient sheet.

According to another feature of this invention a method of producing thin sheet-like articles from a polymer of tetrafluoroethylene by moulding and sintering, comprises forming in a mould a plurality of superposed charges of moulding powder, which charges are separated from one another by flexible separator sheets, and have a total thickness such that when moulding pressure is applied without the use of a flexible resilient sheet simultaneously to all the charges the pressure is distributed uniformly over all the charges to produce a plurality of moulded preforms. Preferably the total thickness is at least 0.15". It has been found that if the total thickness of the charges for forming a plurality of thin articles is at least about 0.15" a uniform application of the moulding pressure can be achieved without the interposition of a rubber or like sheet between the charges and the platen of the moulding apparatus. However if desired a rubber sheet may be inserted in the mould above the charges when producing a plurality of thin articles the total thickness of which is more than 0.15" using the method of the preceding paragraph.

It is preferred that in the methods indicated in the two preceding paragraphs in which a plurality of charges are subjected to moulding pressure simultaneously, each charge of moulding powder be consolidated by applying pressure thereto prior to the next charge being introduced into the mould.

Polytetrafluoroethylene has outstanding properties as compared with other plastic materials, the more important being that it remains flexible down to temperature of —80° C. and can be employed at temperatures below 327° C. for long periods without deterioration. Moreover polytetrafluoroethylene is substantially chemically inert and has electrical properties at least equal to or better than those of polythene. Polytetrafluoroethylene also has a low coefficient of friction.

Polytetrafluoroethylene, however, suffers from the disadvantage that when it is deformed by an applied stress over a finite period of time it does not recover its initial dimensions after the stresses on it have been removed, in other words, polytetrafluoroethylene suffers from a tendency to "cold flow."

These disadvantages can be overcome for a thin article such as a sheet, disc, diaphragm or gasket formed from moulded and sintered polytetrafluoroethylene by providing therein one or more layers of metal reinforcements such as one or more layers of gauze or layers of wires. The metal reinforcements should be formed from a metal which is not attacked by polytetrafluoroethylene, for example the reinforcement may be in the form of a stainless steel gauze or a gauze made from Phosphor bronze (which is attacked by polytetrafluoroethylene) coated with a protective material such as chromium. Where the article comprises more than one layer of reinforcement, the wires forming one reinforcement layer are preferably arranged to extend in different directions to the wires forming the adjacent reinforcement layer or layers. The reinforcement layer may be partially embedded in the polytetrafluoroethylene so that free metal projects from the surfaces of the article. Such an arrangement is particularly useful when the article formed from polytetrafluoroethylene is to be clamped between a pair of members, since thereby the article is provided with surfaces having a substantially greater coefficient of friction than would otherwise be the case.

It has been found that articles formed from polytetrafluoroethylene and reinforced in accordance with this invention have an increased strength and reduced cold flow characteristics as compared with articles consisting substantially wholly of polytetrafluoroethylene.

In this specification, an article will be referred to as being "unreinforced" if it comprises no reinforcement layer, will be referred to as "reinforced" if it comprises a single reinforcement layer, and will be referred to as "laminated" if it comprises more than one reinforcement layer.

In the production of reinforced articles or laminated articles by the above methods the reinforcement layer or layers are introduced into the mould upon a part-charge of moulding powder and are then either completely covered or partially covered with the remainder of the powder charge. The metal forming the reinforcing, such as the metal gauze, should be cleaned thoroughly prior to insertion in the mould and should be perfectly flat, and to avoid lateral distortion of the reinforcement layer on application of the moulding pressure, the reinforcement layer should have dimensions only slightly less than the dimensions of the cavity of the mould.

Another difficulty that has been experienced in producing moulded sintered sheet-like articles from polytetrafluoroethylene whether unreinforced or laminated, is that if the moulded preform is heated suddenly to the sintering temperature blistering of the resulting product occurs.

According to this invention in yet another aspect therefore in the production of moulded sintered sheet-like articles, whether reinforced or laminated, from polytetrafluoroethylene, the moulded preform is gradually heated from a temperature below the transition temperature to the sintering temperature in such manner that blistering of the article is avoided. For instance, the moulded preform may be introduced into an oven heated to 150° C. and the temperature gradually raised to the sintering temperature of 380° C. over a period of about 1¼ hours.

There will now be described the application of the above and other features of this invention in the production of thin sheet-like articles from polytetrafluoroethylene, such for example as discs, diaphragms, gaskets and the like.

*Production of unreinforced articles*

In the methods described below thin sheet-like unreinforced articles are produced:

(a) As a plurality simultaneously; and
(b) One at a time.

(a) The polytetrafluoroethylene moulding powder is carefully screened through a sieve of 20–30 mesh so that all fibrous particles are removed from the moulding powder. A charge of the screened moulding powder sufficient to form a single article is then introduced into the mould, the powder being spread evenly across the bottom of the mould. The charge is then consolidated by applying a pressure thereto. A suitable technique is to apply a pressure of about 6 tons per sq. inch for one minute at room temperature. Pressures greater than 6 tons per sq. inch may be used if desired, or lower pressures down to about 500 lbs. per sq. inch may be used in conjunction with longer periods of time and/or higher temperatures. A separator of linen tracing paper is next inserted into the mould on top of the consolidated charge and a further charge introduced into the mould on to the separator and consolidated as above described. The operation of charging and consolidating a charge is repeated until the required number of charges have been introduced into the mould, the linen tracing paper separators being placed between each charge and the next successive charge.

The charges are next subjected to a moulding pressure. A suitable technique is to apply a pressure of 6 tons per sq. inch for ten minutes at room temperature, the pressure being gradually built up to the maximum value over a period of about two minutes. Pressures greater than 6 tons per sq. inch may be used if desired, or lower pressures down to about 500 lbs. per sq. inch may be used in conjunction with longer periods of time and/or higher temperatures.

In order to ensure that the moulding pressure is applied uniformly over the whole area of the charges in the mould a rubber sheet of 60° Shore hardness and ⅛" thickness is placed in the mould above the uppermost charge. It has been found that with a combined thickness of the thin articles amounting to at least about 0.15" the need for the rubber sheet has been avoided.

After release of the moulding pressure the preforms are removed from the mould and carefully separated. The linen tracing paper separators facilitate this operation.

The preforms are next subjected to a sintering operation and in order to avoid blistering of the articles they are introduced into a cold oven and then raised to the sintering temperature over a period of time. A suitable heating schedule is as follows:

15 minutes at 150° C.
15 minutes at 200° C.
15 minutes at 250° C.
15 minutes at 300° C.
15 minutes at 350° C.
30 minutes at 390° C.

The sintered articles are then cooled rapidly to below 327° C. by removing them separately from the oven and quickly transferring them to between a pair of cold metal plates, or quickly quenching them in cold water.

The resulting articles are uniform in character and have a tough, substantially amorphous structure.

(b) For the purpose of producing thin articles one at a time a single charge is introduced into the mould and is consolidated by pressure applied uniformly through a rubber sheet of 60° Shore hardness and ⅛" thickness, the moulding pressure being greater than 6 tons per sq. inch or lower as previously described.

The sintering operation is also as described in (a) above.

Production of reinforced articles

In the methods described below thin sheet-like reinforced articles are produced:

(c) As a plurality simultaneously; and
(d) One at a time.

(c) In this method the same steps are employed as (a) of the section headed "Production of unreinforced articles" above, the sole difference being in the manner of introducing each charge to the mould.

Each charge is divided into two portions and first one portion of the charge is introduced into the mould and spread evenly on the bottom of the mould or on the separator above the preceding charge. Next the reinforcement layer is introduced into the mould, the reinforcement being for example 200 mesh stainless steel gauze of 0.005" nominal thickness which is suitable for use in producing reinforced articles having a thickness of 0.015" or more. The gauze should be thoroughly cleaned just prior to its use and must be substantially flat and should have such a size that it has only a small clearance, say a clearance of ⅛", from the walls of the mould in order to avoid lateral distortion of the reinforcement layer on application of the moulding pressure. The second portion of the moulding powder charge is then spread evenly on top of the reinforcement layer.

In order to ensure that the moulding pressure is applied uniformly over the whole area of the charges in the mould a rubber sheet of 60° Shore hardness and ⅛" thickness is placed in the mould above the uppermost charge. It has been found that with a combined thickness of the thin articles amounting to at least about 0.15" the need for the rubber sheet has been avoided.

(d) For the purpose of producing thin articles one at a time a single charge is introduced into the mould and is consolidated by pressure applied uniformly through a rubber sheet of 60° Shore hardness and ⅛" thickness, the moulding pressure being greater than 6 tons per square inch or lower as previously described.

The sintering operation is also as described in (a) above.

Production of laminated articles

In the methods described below thin sheet-like laminated articles are produced:

(e) One at a time.
(f) As a plurality simultaneously.

(e) In this method the article consists of alternate layers of polytetrafluoroethylene and stainless steel gauze reinforcement. For example the polytetrafluoroethylene layers have a thickness of about 0.005" and the stainless steel gauze may be 200 mesh gauze having a nominal thickness of 0.005".

Alternate layers of polytetrafluoroethylene and gauze discs are inserted into the mould until the required number of layers have been introduced. The moulding powder is screened as in previously described methods and each layer of moulding powder is spread evenly prior to the insertion of the gauze layer. The gauze should be thoroughly cleaned just prior to its use, for example in a vapour degreaser and should be substantially flat, and the gauze should have such a size as to fit fairly closely in the mould in order to avoid lateral movement on application of the moulding pressure.

The charge in the mould is next subjected to moulding pressure and the pressure should be applied gradually to prevent displacement of the gauze layers and to allow the moulding powder to flow uniformly during application of the pressure. One suitable schedule for the application of moulding pressure is as follows:

2 minutes at 2 tons per sq. inch.
2 minutes at 4 tons per sq. inch.
10 minutes at 6 tons per sq. inch.

This schedule is suitable when the moulding pressure is carried out at about 20° C. The moulding pressure may be applied, however, at temperatures greater than 20° C. and as the temperature at which pressure is applied is increased, the pressure and/or the time for which pressure is applied may be decreased. Thus, for example, if moulding is carried out at 200° C. the moulding pressure is built up gradually to 6 tons per sq. inch as before and the pressure of 6 tons per sq. inch maintained for a period of five minutes. A rubber sheet of, say, 60° Shore hardness and ⅛" thickness is inserted between the platen of the moulding apparatus and the charge so as to ensure that the pressure applied to the charge is uniform over the whole surface area of the charge.

After moulding, the preform is removed from the mould and introduced into an oven maintained at 150° C. The temperature in the oven is then gradually increased to the sintering temperature so as to avoid blistering of the laminated article.

15 minutes at 150° C.
15 minutes at 200° C.
15 minutes at 250° C.
15 minutes at 300° C.
15 minutes at 350° C.
30 minutes at 390° C.

On completion of the sintering operation the sintered article is removed from the oven and is quenched immediately, for example by being placed between cold metal plates so that its temperature is rapidly reduced below 327° C.

Only small pressure should be used when quenching between the cold metal plates, otherwise distortion of the laminated article will occur. A suitable form of quenching plate can be formed from ¼" aluminium and the top plate preferably has a weight of about 2½ lbs.

Other quenching methods may be used, for instance the articles may be quenched by immersing them in cold water.

(f) Two or more laminated articles may if desired be moulded simultaneously following the method described in (e) above, and if the total thickness of the articles in the mold at one time is at least about 0.15" the rubber sheet may be omitted from between the charge and the platen of the moulding apparatus.

We claim:

1. A method of producing sheet-like articles having a thickness substantially less than 0.15 inch from a polymer of tetrafluoroethylene which comprises the steps of moulding preforms at substantially room temperature, releasing the moulding pressure, heating said preforms to a sintering temperature, and then cooling the sintered article, wherein the preforms are moulded from said polymer in dry powder form by spreading a plurality of charges of said dry powder one above the other in the mould, which charges are separated from one another by flexible separator sheets, and consolidating said charges by the application of pressure, so that said charges have a total thickness substantially greater than 0.15 inch, whereby the powder in said preforms has a high degree of uniformity after consolidation, resulting in the absence of low-pressure spots in the finished articles.

2. A method as claimed in claim 1 wherein the consolidating pressure is applied to the charges through a sheet of flexible resilient material.

3. A method as claimed in claim 1 wherein the consolidating pressure is applied to the charges through a flexible resilient rubber sheet.

4. A method as claimed in claim 3 wherein the rubber is ⅛" thick and is of 60° Shore hardness.

5. A method as claimed in claim 1 wherein the separator sheets are formed from linen tracing cloth.

6. A method as claimed in claim 1 comprising also the steps of introducing an article-forming charge into the mould in a number of parts and of introducing a layer of reinforcement into the mould between the part charges.

7. A method as claimed in claim 6 wherein the reinforcement layer is completely covered by a part of the charge.

8. A method as claimed in claim 1 wherein the charge for forming an article is introduced into the mould in a number of parts and a layer of reinforcement is introduced into the mould between two charge parts, the charge part introduced in the mould following the reinforcement layer being insufficient completely to cover the layer of reinforcement.

9. A method as claimed in claim 6 wherein the reinforcement layer has its dimensions slightly less than the dimensions of the cavity of the mould.

References Cited in the file of this patent

UNITED STATES PATENTS

| | | |
|---|---|---|
| 1,146,413 | Edison | July 13, 1915 |
| 2,070,023 | Olsen | Feb. 9, 1937 |
| 2,267,372 | Calkins et al. | Dec. 23, 1941 |
| 2,276,035 | Guhl | Mar. 10, 1942 |
| 2,368,717 | Marschner | Feb. 6, 1945 |
| 2,440,190 | Alfthan | Apr. 20, 1948 |
| 2,456,262 | Fields | Dec. 14, 1948 |
| 2,578,209 | Schwarz | Dec. 11, 1951 |